June 24, 1930.  C. B. SIMMONS  1,767,407
ANTIFRICTION BEARING CAGE
Filed March 21, 1928

INVENTOR:
CHARLES B. SIMMONS,
BY Gales P. Moore
HIS ATTORNEY.

Patented June 24, 1930

1,767,407

UNITED STATES PATENT OFFICE

CHARLES B. SIMMONS, OF BRISTOL, CONNECTICUT, ASSIGNOR TO THE NEW DEPARTURE MANUFACTURING COMPANY, OF BRISTOL, CONNECTICUT, A CORPORATION OF CONNECTICUT

ANTIFRICTION-BEARING CAGE

Application filed March 21, 1928. Serial No. 263,278.

This invention relates to antifriction bearing cages and comprises all the features of novelty herein disclosed. An object of the invention is to provide an improved cage for guiding and holding the rolling elements of an antifriction bearing. Another object is to provide a very strong cage which is capable of being accurately formed by press operations and readily assembled. Another object is to provide an improved fastening device for cage sections.

The invention, in its broader aspects, is not necessarily limited to the specific form selected for illustrative purposes in the accompanying drawings in which Fig. 1 is a side view of a portion of a circular blank from which one of the cage sections is formed.

Figure 1:
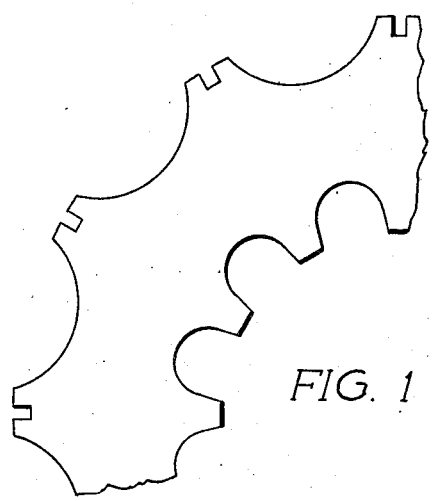
Figure 2:
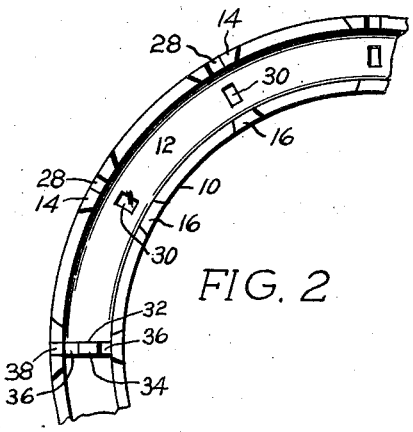
Fig. 2 is an inner side view of a portion of one of the cage sections with one fastener inserted.

The cage comprises a pair of opposed rings 10 of angular cross section, the section preferably being that of a U, and each ring having a continuous annular side wall 12, a set of inwardly extending legs or projections 14 at its outer edge, and a set of inwardly extending legs or projections 16 at its inner edge. The outer legs or projections 14 terminate in flat abutment faces 18 and the inner legs or projections 16 terminate in flat abutment faces 20. The corresponding faces of one ring abut against those of the other, in the preferred construction. The rings have registering pockets for rolling elements, the pockets being formed by the side edges 22 and 24 of the legs or projections 14 and 16. In the case of a ball bearing, the edges 22 and 24 are spherical segments conforming to the balls 26. When both sets of faces 18 and 20 abut, as is preferable, closed compartments are formed between the balls, usable to contain lubricant.

One set of legs or projections on each ring, preferably the outer set 14, is notched as indicated at 28 and the side wall 12 of each ring has a series of straight sided openings 30. The notches 28 of one ring register with the notches of the other ring and the openings 30 of one ring register with the openings 30 of the other. Also the notches are in radial alignment with the openings. The rings are secured together by fastening devices 32, each comprising a flat body portion with reduced end extensions 34, shoulders 36, and a central lug or key 38. Each key or lug 38, in the completed cage, extends radially outwards from the body portion and is arranged to enter and fill a pair of registering notches 18, thus locking the rings against relative rotation or weaving. The extensions 34 are also radially arranged and enter registering openings 30 in the rings, the extensions being riveted down to hold the rings together with their side walls 12 against the shoulders 36. Preferably the fastening devices are of sufficient radial width to fill the spaces between the outer and inner sets of legs or projections 14 and 16, thereby bracing the latter and forming partitions in the compartments between adjacent ball pockets. Hence the fasteners constitute braces as well as rivets and keys.

Figure 3:
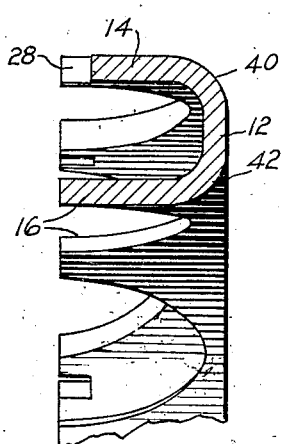
Fig. 3 is a cross sectional view of a portion of one of the cage sections prior to a subsequent forming operation.
Figure 4:
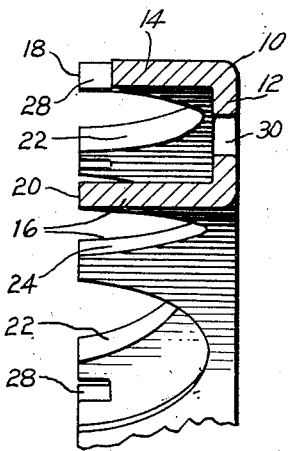
Fig. 4 is a cross sectional view of a portion of one of the completed cage sections, the section being taken between two adjacent ball pockets.
Figure 5:
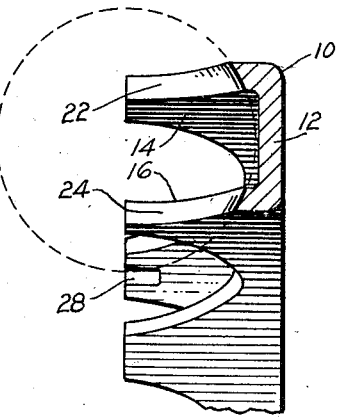
Fig. 5 is a similar cross sectional view taken through one of the pockets.
Figure 6:
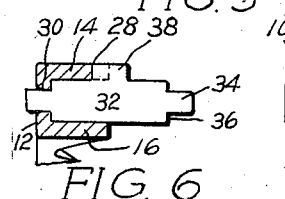
Fig. 6 is a cross sectional view of a portion of one cage section with one of the fastening devices inserted.
Figure 7:
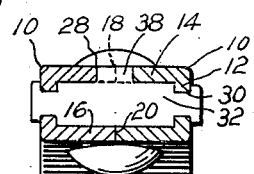
Fig. 7 is a cross sectional view of a portion of the completed cage.
Figure 8:
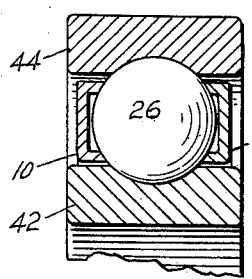
Fig. 8 is a cross sectional view of a portion of a completed ball bearing with the cage in place.

The cage rings are desirably formed by pressing operations on an aluminium alloy blank such as indicated in Fig. 1. Each ring may first be drawn to the form indicated in Fig. 3, the corners 40 and 42 being quite rounded. On a second drawing operation, the ring is shaped to the form indicated in Fig. 4, the substantial squaring of the corners making the ring a little narrower. The edges 22 and 24 of the ball pockets are desirably swaged as by a series of ball-ended dies having a radius a very little larger than the balls to be used in the completed bearing. The swaged edges are so located that the enclosed balls are held just out of contact with the side walls 12. When swaging the pocket edges, the notches 28 are filled by suitable tools which locate the ring with respect to the dies and prevent distortion. In assembling the rings, the fasteners are first applied to one ring as indicated in Fig. 6. The lugs or keys 38 and the end extensions 34, in conjunction with the notches 28 and the openings 30, then hold the fasteners in proper position to receive and locate the other ring. Fig. 8 indicates a completed cage applied to a ball bearing having an inner race ring 42 and an outer race ring 44.

I claim:

1. In an antifriction bearing, a cage comprising opposed rings of channelled cross section abutting against one another at their edges and having registering pockets for rolling elements, and a device comprising a combined rivet and key fastening the rings together between adjacent pockets and interlocking with said rings at their abutting edges, for holding them against relative rotation; substantially as described.

2. In an antifriction bearing, a cage comprising opposed rings having registering pockets for rolling elements and registering notches between the pockets, and fasteners passing through the rings for securing them together and each fastener having a key lug entering the registering notches to hold the rings from relative rotation; substantially as described.

3. In an antifriction bearing, a cage comprising opposed rings having registering pockets for rolling elements, the rings abutting against one another between the pockets and having registering notches in the abutting portions, the rings having registering openings, and fastening devices passing through the registering openings and having lugs entering the registering notches; substantially as described.

4. In an antifriction bearing, a cage comprising opposed rings having pockets for rolling elements, the rings having continuous side walls and inwardly extending edge projections abutting against one another between the pockets, the abutting edge projections having registering notches and the side walls having registering openings, and fastening devices passing through the registering openings and having lugs entering the registering notches; substantially as described.

5. In an antifriction bearing, a cage comprising opposed rings having pockets for rolling elements, the rings having continuous side walls with inner and outer sets of projections between the pockets, the outer projections of the rings abutting against one another and having registering notches, and fastening devices in the spaces between the side walls and the projections and having lugs entering the notches; substantially as described.

6. In a cage for antifriction bearings, a cage ring fastener having a body portion, reduced extensions at the ends of the body portion, and a key lug projecting from one edge of the body portion; substantially as described.

7. In a cage for antifriction bearings, a cage ring fastener having a body portion, reduced extension at the ends of the body portion, and a key lug projecting from one edge of the body portion at the center, the key lug and the reduced extension being flat and lying in the same plane; substantially as described.

In testimony whereof I hereunto affix my signature.

CHARLES B. SIMMONS.